(12) United States Patent
Soler Soneira et al.

(10) Patent No.: US 6,741,068 B2
(45) Date of Patent: May 25, 2004

(54) VOLTAGE STABILIZER FOR ELECTRICAL ENERGY TRANSPORTATION AND DISTRIBUTION APPLICATIONS

(75) Inventors: David Soler Soneira, Madrid (ES); Rafael Chao Gómez, Madrid (ES)

(73) Assignee: Universidad Pontificia Comillas, Madrid (ES)

( * ) Notice: Subject to any disclaimer, the term of this patent is extended or adjusted under 35 U.S.C. 154(b) by 50 days.

(21) Appl. No.: 10/081,429

(22) Filed: Feb. 22, 2002

(65) Prior Publication Data

US 2003/0006741 A1 Jan. 9, 2003

(30) Foreign Application Priority Data

Feb. 23, 2001 (ES) ......................................... 200100424

(51) Int. Cl.[7] ............................................. G05B 24/02
(52) U.S. Cl. ....................................... 323/346; 323/255
(58) Field of Search ................................ 323/247, 251, 323/255, 252, 340, 345, 346, 262

(56) References Cited

U.S. PATENT DOCUMENTS 5,001,623 A * 3/1991 Magid ..................... 323/346 X

* cited by examiner

*Primary Examiner*—Jessica Han
(74) *Attorney, Agent, or Firm*—Collen IP; Donald J. Ranft

(57) ABSTRACT

Voltage stabiliser for electrical energy transportation and distribution applications, which consists of one or several electromagnetic devices of transformer type which, at discrete intervals, regulates the output voltage that reaches the consumer, taking the form of a transformer with a dual or quadruple primary winding and a simple secondary winding, the simple winding being able to be positioned before or after the parallel branch, the performance of the equipment remaining the same.

11 Claims, 3 Drawing Sheets

VOLTAGE STABILIZER FOR ELECTRICAL ENERGY TRANSPORTATION AND DISTRIBUTION APPLICATIONS

BACKGROUND OF THE INVENTION

Field of the Invention

This invention relates to the field of electrical energy transportation and distribution and in particular to a voltage stabilizer/booster that regulates output voltage in incremental steps.

Description of Related Art

Problems with the regulation of voltage in electrical energy distribution are known in the art, as are techniques and systems that mitigate the problem.

Autotransformers are commonly used to regulate and/or boost an input voltage to provide a constant output voltage regardless of voltage drops on the input. Typically, such autotransformers are controlled by static or mechanical switches, or via the use of motorized, continuously adjusted autotransformers. Such equipment is typically expensive, and/or somewhat unreliable.

BRIEF SUMMARY OF THE INVENTION

It is an object of this invention to provide a voltage stabilizer that can be used at different electrical energy voltage levels, capable of being installed in single phase or three-phase networks, to provide a regulated output voltage.

This objects and others are achieved via a voltage stabilizer consisting of one or mote electromagnetic devices of transformer type, and which, in incremental steps, regulates the output voltage, particularly within electrical networks with large voltage drops.

The basic regulation device consists of a transformer with a primary dual or quadruple winding, and with a simple secondary winding, that is configured to withstand the supply line's full intensity. The secondary is configured to lie in series between the supply input and the regulated output, and may be positioned before of after the configurable primary branch. Via appropriate configurations of the primary windings, corrections are made to the output voltage, with the purpose of keeping it within pre-set margins.

This basic element offers features of very considerable economy, robustness and efficacy, the output discrimination being five or nine-step, which makes the invention of interest to installations where there is a major problem of voltage regulation and where a coarse regulation is required at around the nominal voltage value.

Nevertheless, should greater resolution be needed, the invention admits the use of devices in series, with regulations stepped 4:1.

BRIEF DESCRIPTION OF DRAWINGS

The invention is explained in further detail, and by way of example, with reference to the accompanying drawings wherein.

Throughout the drawings, the same reference numerals indicate similar or corresponding features or functions.

DETAILED DESERTION OF THE INVENTION

The voltage stabilizer of this invention may be embodied for a single-phase transformation, or thrice replicated for use in a three-phase network. In a three-phase application, independent control of each phase may be provided, or a common control, using multi-pole switches, may be employed, as will be evident to one of ordinary skill in the art in view of this disclosure.

There are two variants of the invention, distinguished by whether the line compensation (secondary coil) lies "downstream" (FIG. 1), or "upstream" (FIG. 2) the primary branch, which lies parallel to the input supply in each variant. The downstream compensation, shown in FIG. 1, allows the main transformer's power to be reduced, at the price of not exploiting to the full the magnetic circuit at non-nominal voltages. There is full exploitation in upstream compensation; the scheme for which is shown in FIG. 2.

Figure 3:
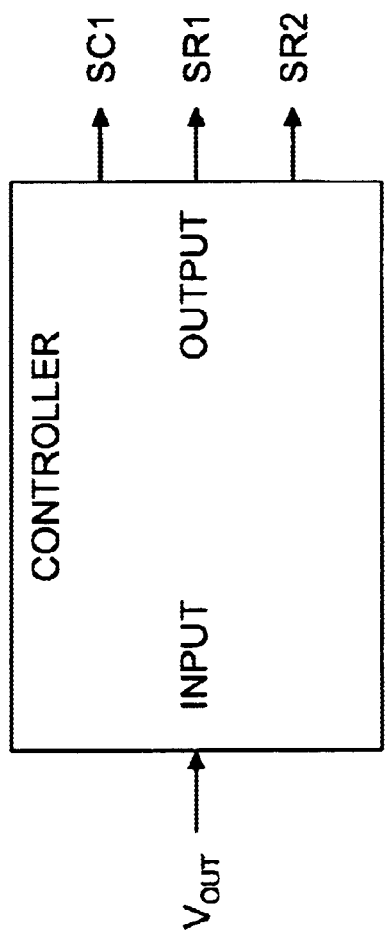
FIG. 3 illustrates an example of a controller in accordance with this invention depicting typical inputs and outputs.

In each of the variants, the voltage stabilizer comprises a transformer, trip/contact/relay elements, and a controller. The controller (FIG. 3 controls each of the switches/relay elements SC, SR1, and SR2, as detailed below, and is preferably implemented as a microprocessor that measures the output voltage Vout. The switch/relay SC is a power-cutting clement that controls whether to engage the transformer to effect an increase or decrease in the output voltage.

The transformer comprises primary coils P1 and P2, and secondary coil S. The primary coils P1 and P2 are configured, via the switch SR1 to either in parallel, or in series, with each other, and in parallel with the input supply voltage (FIG. 1), or the output supply voltage (FIG. 2). The switch SR2 determines the direction of coupling (polarity) between the primary P1, P2 and secondary S coil arrangements. The primary coils P1 and P2 are substantially identical to each other, and have substantially equivalent coupling to the secondary coil S.

The configurations shown in FIGS. 1 and 2 allow for five possible states of the transformer arrangement, as follows:

With SC in the position illustrated, the secondary coil S is bypassed, and the primary coils P1, P2 are disengaged. In this state, the output voltage Vout will equal the input voltage Vin. Preferably, this state is the default state, thereby allowing a continuous output voltage in the event of a failure of one or more of the elements comprising the voltage stabilizer.

With SC in a position opposite to that illustrated, the secondary coil S is placed in series between the input voltage Vin and the output voltage Vout, and the primary coils are engaged. In this state, the output voltage is given as:

$$Vout = Vin + Vs,$$

where Vs is the voltage across the secondary coils S.

At the positions illustrated, the primary coils are coupled in series with each other, via SR1, and the coupling, via SR2, places the voltage Vs across the secondary coil S in phase with the input voltage Vin. Assuming that the number of turns in each primary is Np and the number of turns in the secondary is Ns, the voltage across the secondary coil S, and the output voltage are given as:

$Vs = Vp*Ns/(2*Np)$, and $Vout = Vin + Vp*Ns/(2*Np)$, where Vp is the voltage across the primary branch, and the 2*Np term is due to the fact that two primary coils, each of Np turns, are connected in series within this branch. When SR2 is in the position opposite to the position shown in the rage, the phase of the induced voltage in the secondary S is reversed, and $Vout = Vin - Vp*Ns/(2*Np)$.

When SR1 is in the position opposite to the position in the figures, and SR2 is as illustrated, the primary coils are connected in parallel. In this state, the voltage across the secondary coil S, and the output voltage are given as:

$Vs = Vp*Ns/Np$, and $Vout = Vin + Vp*Ns/Np$.

When SR2 is in the position opposite to the position in the figures, the phase of the induced voltage in the secondary S is reversed, and $Vout = Vin - Vp*Ns/Np$.

Figure 1:
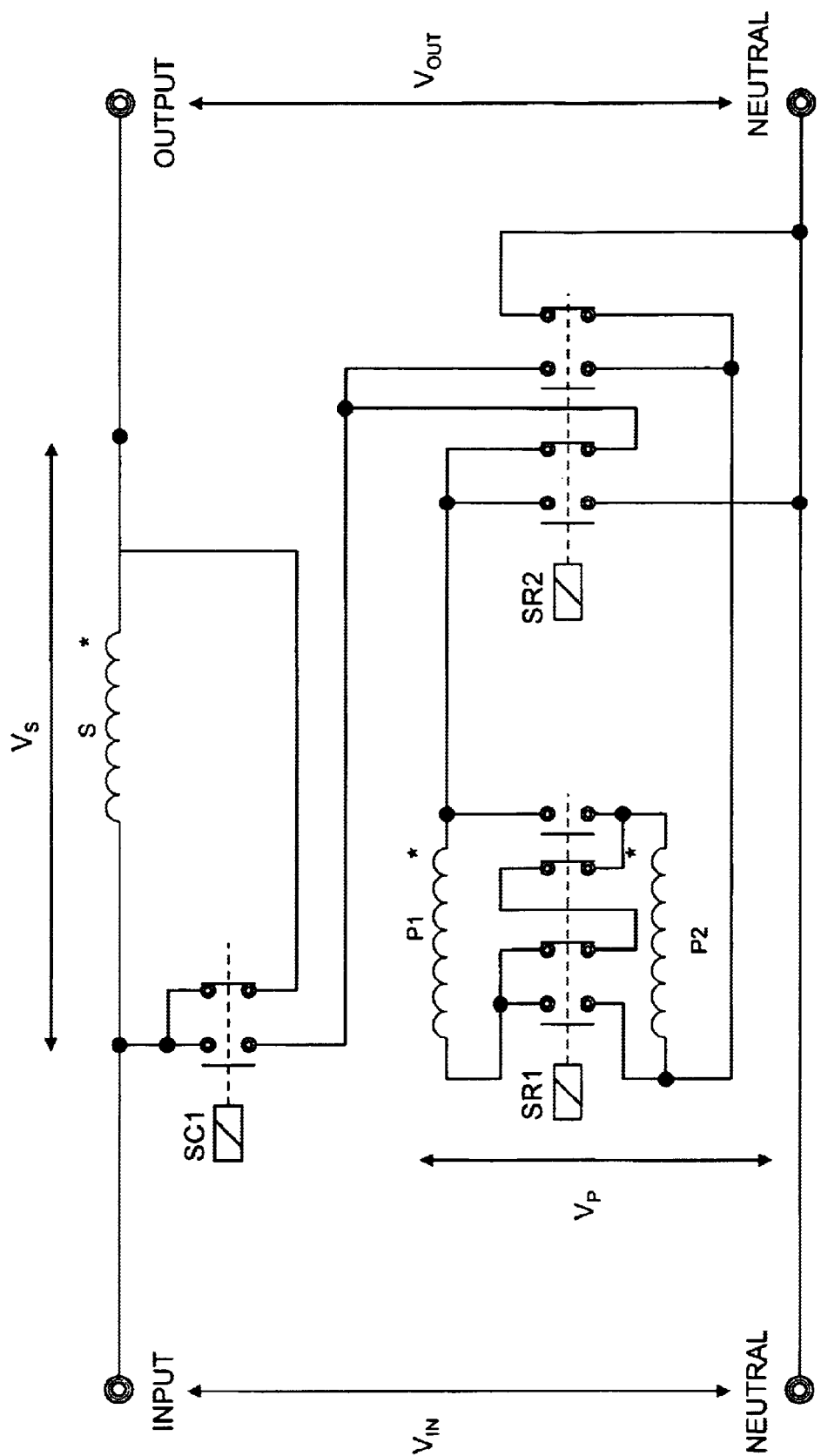
FIG. 1 illustrates an example block diagram of a single-phase voltage stabilizing device in accordance with this invention, wherein the secondary winding is placed after the primary branch, thereby allowing the transformer power to be reduced, at the cost of not fully exploiting the range of voltage regulation available.
Figure 2:
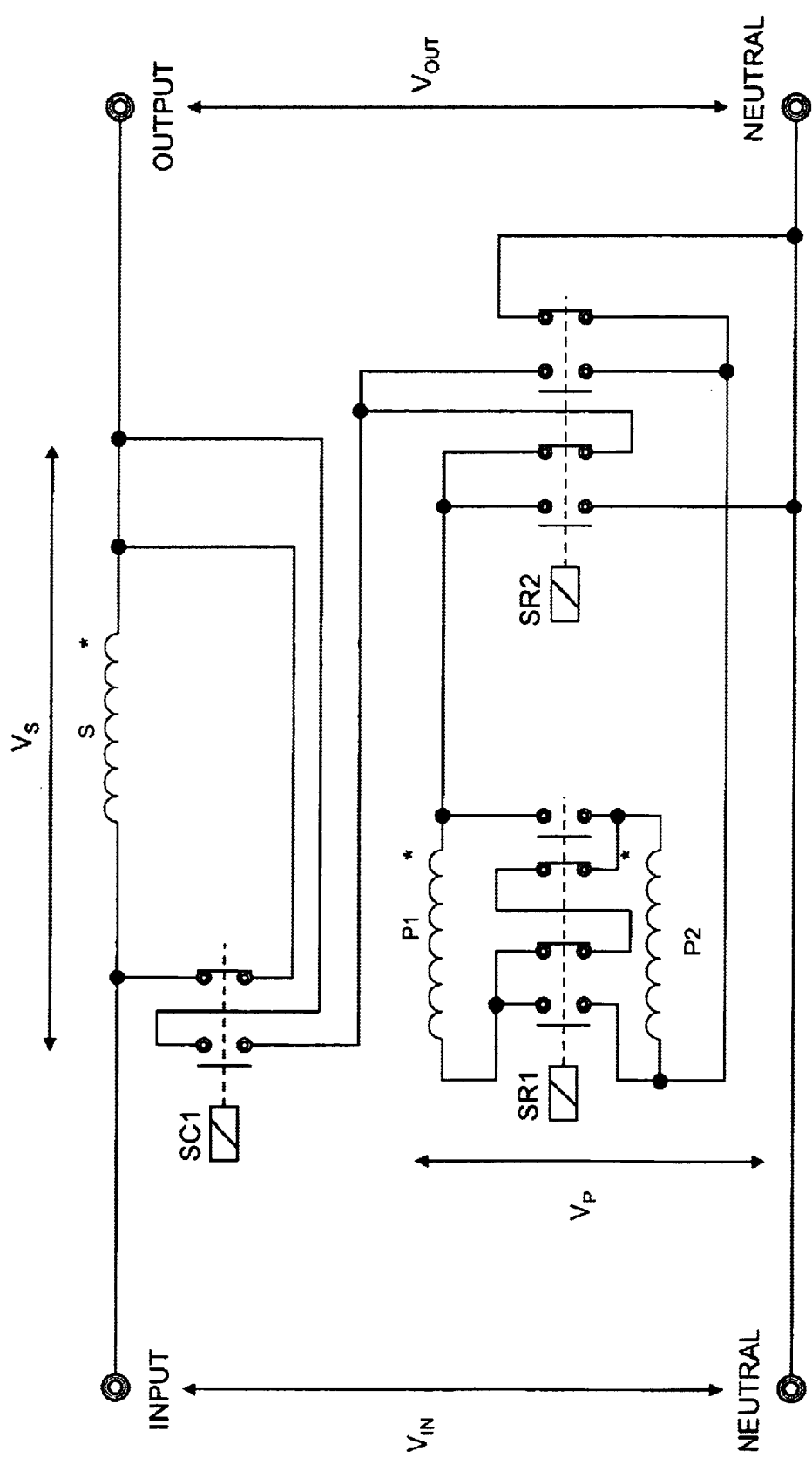
FIG. 2 illustrates an example block diagram of a single-phase voltage stabilizing device in accordance with this invention, wherein the secondary winding is placed before the primary branch, thereby fully exploiting the range of voltage regulation available from this device.

In FIG. 1, Vp corresponds to Vin, whereas, in FIG. 2, Vp corresponds to Vout. Table 1 illustrates the output voltage for each state of the switches/relays SC, SR1, SR2, where "0" corresponds to the dc-asserted states illustrated in the figures, and "1" corresponds to the asserted opposite state.

TABLE 1

| SC | SR1 | SR2 | Vout FIG. 1 | Vout FIG. 2 |
|----|-----|-----|-------------|-------------|
| 0  | —   | —   | Vin         | Vin         |
| 1  | 0   | 0   | Vin(1 + 0.5*Ns/Np) | Vin/(1 - 0.5*Ns/Np) |
| 1  | 0   | 1   | Vin(1 - 0.5*Ns/Np) | Vin/(1 + 0.5*Ns/Np) |
| 1  | 1   | 0   | Vin(1 + Ns/Np) | Vin/(1 - Ns/Np) |
| 1  | 1   | 1   | Vin(1 - Ns/Np) | Vin/(1 + Ns/Np) |

As illustrated, the circuits of FIGS. 1 and 2 provide five incremental steps of voltage adjustment, corresponding to increments of 0.5*Ns/Np. When four primaries are provided, the switch/relay SR1 is configured to provide one, two, three, or four coils in series, thereby providing incremental steps corresponding to increments of 0.25*Ns/Np.

In a preferred embodiment of this invention, the controller is configured to measure the output voltage Vout periodically, and correspondingly adjusts the switch/relays SC, SR1, SR2 as required to incrementally increase or decrease the output voltage. Preferably, when a change of state of SR1 or SR2 is required, SC is deasserted to disengage the primary coils before the change of state is introduced.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

What is claimed is:

1. A voltage stabilizer, comprising:

a pair of primary coils, a secondary coil that is inductively coupled to each of the pair of primary coils, and a first switch that is configured to couple the pair of primary coils in a first state or a second state, the first state corresponding to a series connection of the pair of primary coils, and a second switch that is configured to selectively invert a direction of coupling between the pair of primary coils and the secondary coil, and a third switch that is configured to selectively couple the pair of primary coils to a supply input voltage, and a controller that is configured to measure an output voltage and to correspondingly control the first second and third switches to adjust the output voltage to correspond to a nominal voltage.

2. A voltage stabilizer that is configured to provide an output voltage from an input voltage, comprising:

a plurality of primary coils, a secondary coil, inductively coupled to each primary coil of tho plurality of primary coils, and configured in series between the input voltage and the output voltage to effect a change in the output voltage relative to the input voltage, one or more switch elements that are configured to effect select configurations of the primary coils, and a controller that is configured to measure the output voltage and correspondingly control the one or more switches to adjust the output voltage to substantially correspond to a nominal voltage level.

3. The voltage stabilizer of claim 2, wherein the one or more switch elements include static trip elements.

4. The voltage stabilizer of claim 2, wherein the plurality of primary coils and the secondary coil are replicated three times to provide a three-phase set of output voltages.

5. The voltage stabilizer of claim 4, wherein each of the one or more switch elements are configured to control the corresponding replicated primary and secondary coils.

6. The voltage stabilizer of claim 2, wherein each primary coil of the plurality of primary coils is substantially identical, and has a substantially equal inductive coupling to the secondary coil.

7. The voltage stabilizer of claim 6, wherein the controller is configured to control the one or more switches so as to arrange the plurality of coils in series, parallel, or series-parallel.

8. The voltage stabilizer of claim 2, wherein the controller is configured to control the one or more switches so as to arrange the plurality of coils in series, parallel, or series-parallel.

9. The voltage stabilizer of claim 2, wherein at least one switch of the one or more switches is configured to bypass the secondary coil, so that the output voltage corresponds to the input voltage.

10. The voltage stabilizer of claim 9, wherein the at least one switch is also configured to disengage the plurality of primary coils from the input voltage.

11. The voltage stabilizer of claim 2, wherein at least one switch of the one or more switches is configured to arrange the plurality of primary coils in one of: a series connection and a parallel connection, and at least one other switch of the one or more switches is configured to control a direction of coupling between the plurality of primary coils and the secondary coil.

* * * * *